Nov. 11, 1924.　　　　　　　　　　　　1,514,634
T. H. SEELY
SHOE AND METHOD OF MAKING THE SAME
Filed Oct. 24, 1921　　　3 Sheets-Sheet 1

INVENTOR
Thomas H. Seely
By his Attorney,
Nelson R. Howard

Nov. 11, 1924.
T. H. SEELY
1,514,634
SHOE AND METHOD OF MAKING THE SAME
Filed Oct. 24, 1921  3 Sheets-Sheet 2
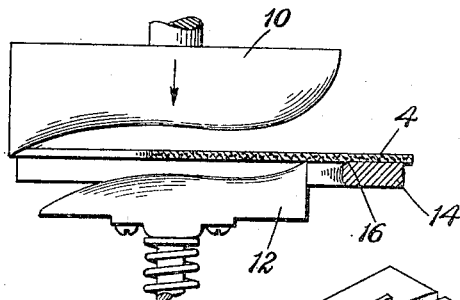
Fig. 4.
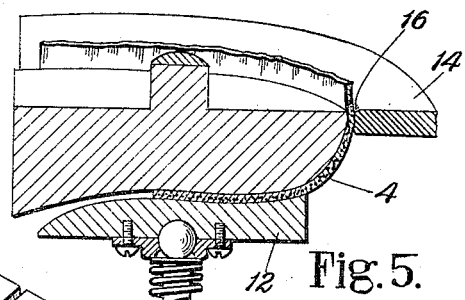
Fig. 5.
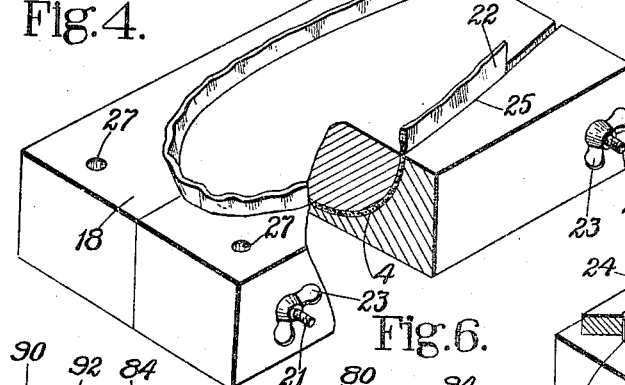
Fig. 6.
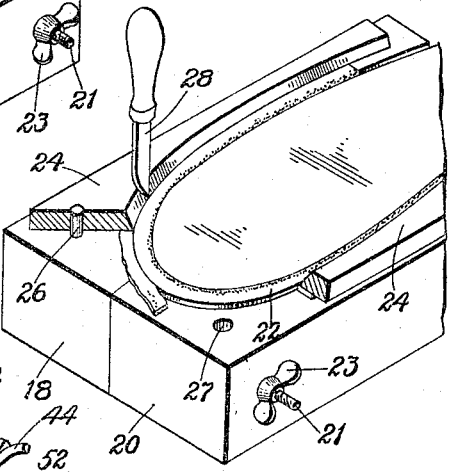
Fig. 7.
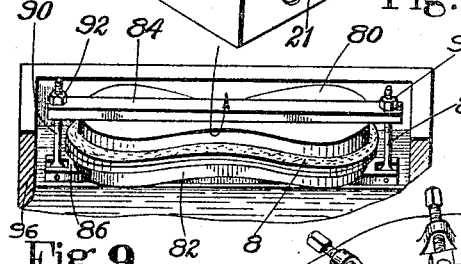
Fig. 9.
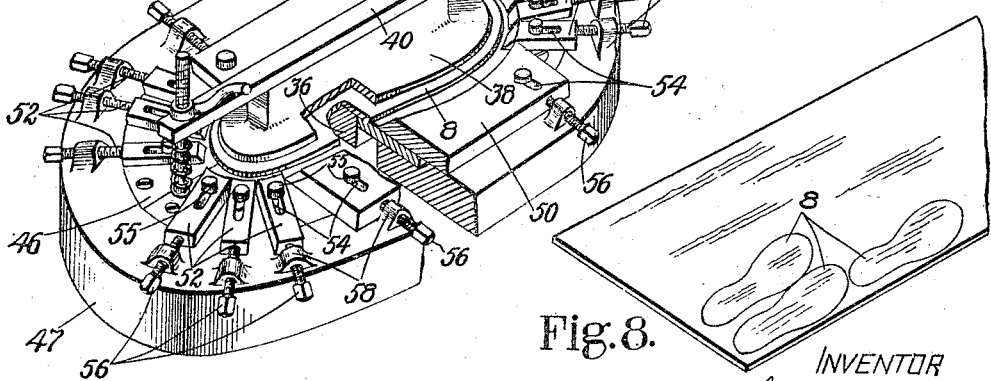
Fig. 10.
Fig. 8.
INVENTOR
Thomas H. Seely
By his Attorney Nov. 11, 1924.                                              1,514,634
                      T. H. SEELY
            SHOE AND METHOD OF MAKING THE SAME
                  Filed Oct. 24, 1921        3 Sheets-Sheet 3
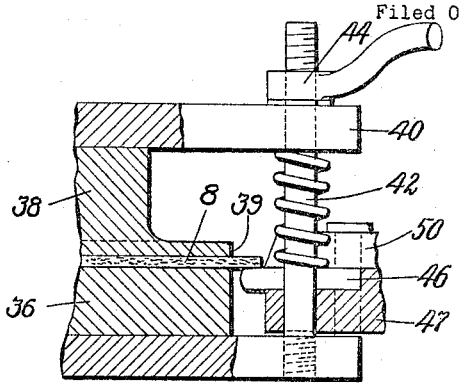
Fig.11.
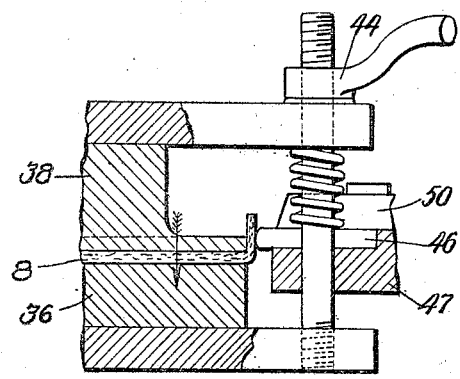
Fig.12.
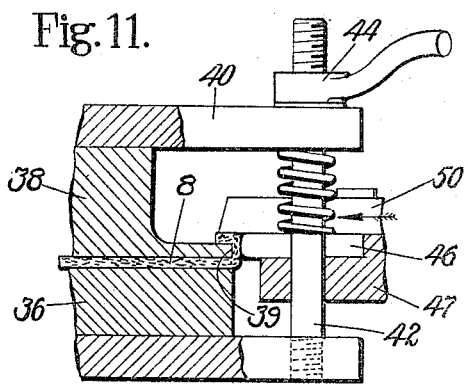
Fig 13
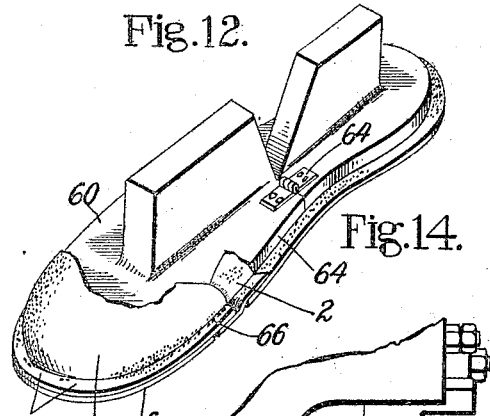
Fig.14.
Fig.16.
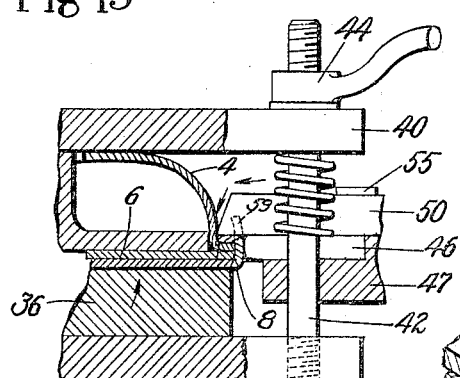
Fig.15.
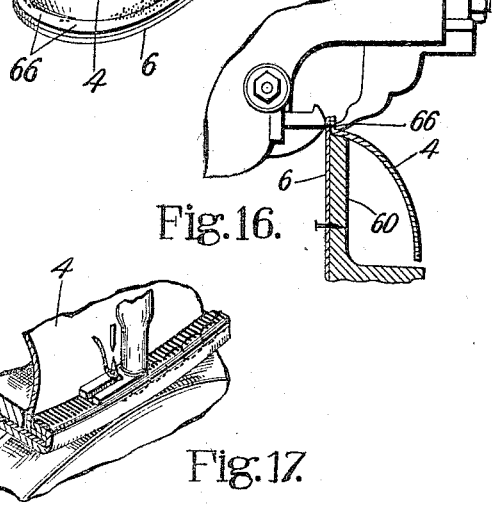
Fig.17.
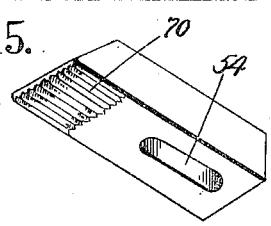
Fig.18.
INVENTOR.
Thomas H. Seely
By his Attorney,
Nelson W. Howard Patented Nov. 11, 1924.

1,514,634

UNITED STATES PATENT OFFICE.

THOMAS H. SEELY, OF MALDEN, MASSACHUSETTS, ASSIGNOR TO UNITED SHOE MACHINERY CORPORATION, OF PATERSON, NEW JERSEY, A CORPORATION OF NEW JERSEY.

SHOE AND METHOD OF MAKING THE SAME.

Application filed October 24, 1921. Serial No. 509,852.

*To all whom it may concern:*

Be it known that I, THOMAS H. SEELY, a citizen of the United States, residing at Malden, in the county of Middlesex and State of Massachusetts, have invented certain Improvements in Shoes and Methods of Making the Same, of which the following description, in connection with the accompanying drawings, is a specification, like reference characters on the drawings indicating like parts in the several figures.

This invention relates to the manufacture of shoes and is herein exemplified as applied to the making of shoes comprising upper parts having outturned flanges with soles secured to the flanges.

Objects of this invention are to provide a very inexpensive, neat and serviceable shoe made of cheap materials such as fiberboard or similar low cost fabricated sheet material; to take advantage of the fact that such materials are alike on both sides; to minimize the number of shoe parts, and effectively and economically to prepare the parts to be assembled and secured together.

In the attainment of these and other objects the invention provides a shoe comprising an upper having an outturned flange and an outsole molded over and down upon the outturned flange. Advantageously an innersole may be provided which preferably has a margin coextensive with the outturned flange of the upper, the margin of the outsole being molded over both the margin of the innersole and the outturned flange. To provide strength and flexibility at the ball line it is desirable that the heel and toe parts of the upper overlap at the ends of the ball line. In order that this advantageous construction may not result in a thickening of the flange over which the outsole is molded, the illustrated innersole is notched out, where the upper flanges overlap, to receive the flange of one of the upper parts so that the thickness of the flange is maintained uniform. The molding of the margin of the outsole across the edge faces of the innersole and the flange of the upper and then down upon the flange of the upper provides a shoe edge of very neat appearance and secure attachment of the parts of the shoe together, particularly when the various resulting thicknesses of the shoe flange are sewed together through and through as herein shown. Before sewing it is desirable to compress the margin of the outsole against the flange of the upper, and in this operation the flange may be given a stitch impression or other ornamentation.

Preferably the parts of the shoe upper are given substantially the shape which they are to assume in the finished shoe by shaping them over a form. In shaping materials of this sort, particularly the blank which is to form the toe portion of the upper, it is desirable to mold the blank to a properly shaped form by a wiper embracing the form, the wiper and form being relatively moved heightwise of the form. To avoid the danger of scratching or scraping the outer face of the blank by movement of the wiper, the advance corner of the wiping face of the wiper is shown as rounded. After the margin of the blank has been made to assume in this manner a position perpendicular to the plane of the shoe bottom, the margin of the upper is turned outwardly over a member having, adjacent to the turning line, a square corner to form the margin into a flange having a definite proper angle to the sides at the toe. To give the outturned flange a definite predetermined width a templet may be employed which, as shown, is so shaped and held with relation to the flange that when followed by a trimming knife a flange of predetermined width results.

Great economy in the number of dies required for a given line of shoes may be effected by taking advantage of the fact that the material is the same on both sides since a plurality of sets of the parts of a shoe may be cut by dies designed for one foot and part of the blanks so made molded the other side up for shoes for the other foot. In the design of shoe herein shown all of the parts are thus reversible.

In molding material such as leatherboard in the manner described, proper tempering of the material is important. The parts of the upper of the shoe before molding are preferably thoroughly tempered in the same manner as leather would be, and before molding are allowed to become nearly dry again, it having been found that the material works best in this condition. If the outsole is tempered in this manner, however, it is found that variations in the size in soles cut by the same die occur which interfere with the proper molding of the outsole over the flange. This material possesses a definite grain extending lengthwise of the sheet and it is found that the greatest variations in size due to tempering occur transversely of the direction of the grain. Accordingly it is desirable to die out the outsoles with the longer axis extending in the direction of the grain of the material so that the greatest expansion of the sole will occur transversely of the sole. Such size variations due to tempering may be practically avoided by protecting the central portion of the blank from the action of the tempering fluid while exposing the margin which is to be molded to the action of the tempering fluid.

Before the upper and innersole are assembled upon the outsole it is preferable to subject the outsole to a preliminary molding operation in which the margin is molded over a form having the shape and thickness of the shoe parts over which, when assembled on the sole, the margin is finally molded. If, as is desirable, the margin is folded completely over and down upon the form, it may be turned up again wholly or completely and the assembled upper and innersole inserted, the parts being properly supported on the inside of the shoe and then the margin subjected to a second molding operation which will be easier than the first and will ensure a better and more complete disposition of the inturned margin over the outturned flange of the upper.

In the drawings,

Fig. 1 is an exploded view showing the shoe parts prepared for assembling;

Fig. 1ª is a view of the toe blank before molding;

Fig. 1ᵇ is a view of the quarter blank before molding;

Fig. 4 is a side view, partly in section, of the toe molding apparatus;

Fig. 5 is a sectional view of the apparatus shown in Fig. 1 after the toe has been molded;

Fig. 6 is a perspective view partly in section of the apparatus for outwardly flanging the upper;

Fig. 7 is a view similar to Fig. 6 showing the step of trimming the outturned flange;

Fig. 8 illustrates the manner of dieing out the sole blanks from a sheet of material;

Fig. 9 is a perspective view, partly in section, of an apparatus for tempering sole blanks;

Fig. 10 is a perspective view, partly in section, of an apparatus for molding the sole;

Figs. 11, 12 and 13 are sectional views showing the successive stages in the operation of molding the margin of the outsole;

Fig. 14 is a perspective view showing the upper and innersole assembled upon a form;

Fig. 15 is a sectional view illustrating the molding of the margin of the outsole down upon the flanges of the assembled upper and innersole;

Fig. 16 illustrates the use of the stitching machine in assembling the upper and innersole;

Fig. 17 illustrates the manner of stitching through the edge extension of the shoe; and Fig. 18 is a perspective view of one of the outsole margin molding members formed to ornament the shoe edge.

Figures 1, 1A:
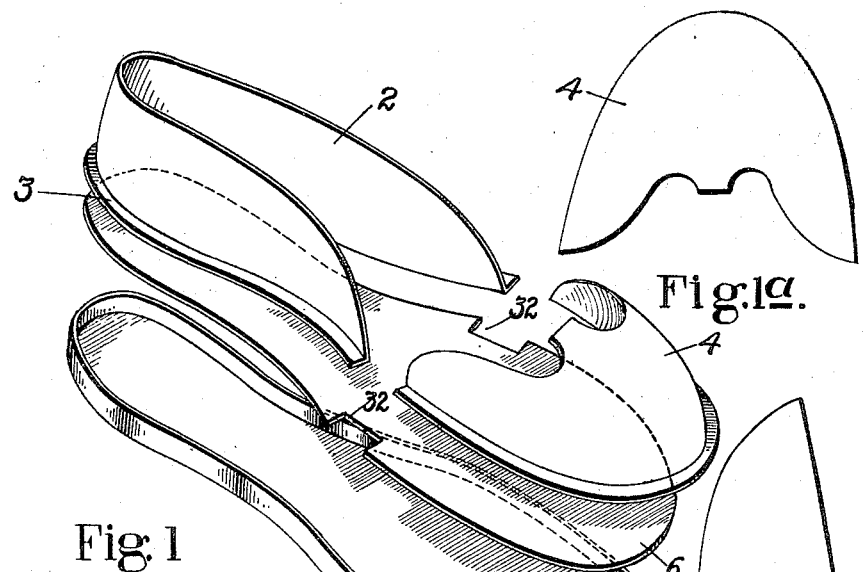

In the practice of this invention a blank 2, which is to constitute the rear and side portions of the shoe upper, is died out and prepared in any usual manner of the shape shown in Fig. 1ᵇ. This blank, which may be referred to as the "quarter" blank by way of identification, is provided with an outturned flange 3 in a manner to be hereinafter more fully explained. A blank 4, to constitute the toe portion of the upper, is similarly prepared as shown in Fig. 1ª. For these blanks I prefer to use material such as fiberboard which is the same on both sides. The blanks for a right shoe may then be made by the same dies as those for a left shoe, the blanks for one shoe being molded one side out and those for the other shoe molded the other side out. Similarly an innersole blank 6 and an outsole blank 8 are died out and used one side up for a right shoe and the other side up for a left shoe. The shoe is made up of these four parts 2, 4, 6 and 8, formed and arranged for assembling as illustrated in Fig. 1.

The toe blank 4 is made to assume the shape shown in Fig. 1 by the method illustrated in Figs. 4, 5, 6 and 7. A form 10 is prepared having the shape, for instance, of the toe portion of a right shoe and the blank 4 arranged the proper side up for a right shoe is pressed against the form 10 by a follower 12 which preferably is of a shape corresponding to a considerable area of the top portion of the form 10. A wiper 14 having a shape corresponding to the peripheral contour of the form 10 is provided and relative movement effected between the wiper and the blank heightwise of the form 10 to cause the blank to conform to the shape of the form as shown in Fig. 5. The blank 4 is wrapped about the form by the action of a rounded advance edge 16 of the wiper 14 which prevents scraping or scratching of the material by the edge of the wiper. The blank, shaped as shown in Fig. 5 is next treated as illustrated in Fig. 6 by members 18 and 20 which are clamped against the blank 4 by suitable means such as threaded rods 21 and wing nuts 23. The members 18 and 20 have square corners 25 resting against the margin of the blank where it is to be turned. The margin 22 of the blank is then turned (preferably outwardly) to form a flange making a square angle with the body portion of the blank. After turning, the flange is clamped down against the members 18 and 20 by a templet 24 which is shaped and located with reference to the outturned margin of the blank so as to expose beyond the inside edge of the templet a flange of predetermined and preferably uniform width. The templet may be located by pins 26 engaging holes 27 in the templet and in the members 18, 20. A knife 28 is then passed along the edge of the templet 24 as a guide to trim off the excess portion of the flange. The quarter blank 2 is molded in a similar manner between inner and outer molds corresponding in shape to the rear portion of the right shoe, the flange being formed and trimmed substantially as described and illustrated in connection with the toe blank in Figs. 6 and 7. The completely molded quarter and toe blanks are shown in Fig. 1 and are of such length that when assembled they will overlap a short distance at each side adjacent to the ends of the ball line, this line being where the greatest amount of flexure of the shoe occurs in wear. It is to be understood that identical blanks are molded the other side out in different sets of molds to form parts of the other shoe of the pair.

Figure 3:
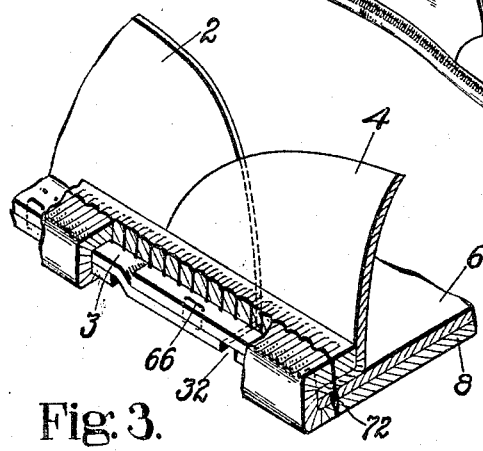
Fig. 3 is a fragmentary view in perspective and section showing the construction of the shoe blank at the ball.

The innersole 6 is died out as shown in Fig. 1, notches 32 being cut out of the margin of the sole at each end of the ball line to accommodate the overlapping portions of the upper parts, for a purpose to be hereinafter more fully explained. The innersole is preferably formed of material of the same kind and thickness as that from which the quarter and toe blanks are formed and is assembled one side out in a right shoe and the other side out in a left shoe. Material such as fiberboard has a pronounced grain extending lengthwise of the sheet and has a greater resistance to fracture when bent transversely of the grain than when bent on a line parallel to the grain. Accordingly it is preferable to die out both the innersole and the outsole blanks with their longer axes extending in the direction of the grain—that is, lengthwise of the sheet. The arrangement of the soles relatively to the sheet is illustrated in Fig. 8. The margin of the outsole is to be bent up over and down upon the flange of the upper parts 2 and 4, as shown in Fig. 3. Hence it is desirable that the outsole have a size corresponding to that of the innersole plus a margin at least equal in width to the thickness of the upper material, the thickness of the innersole material and the width of the flange of the parts 2, 4. Outsole blanks 8 of the proper size are died out of a sheet of material as shown in Fig. 8 with their longer axes extending in the direction of the grain or lengthwise of the sheet, the material being preferably, though not necessarily, thicker than that used for the other parts of the shoe. The outsole blank 8 is prepared for assembling with the upper parts 2, 4 and innersole 6 by a preliminary molding process as illustrated in Figs. 10 to 13. The outsole blank 8 rests on a support 36 to which it is clamped by a plate 38 having the peripheral shape of the innersole of the shoe and a thickness at its edge face 39 equal to that of the innersole and the flange of the upper. The support 36 and the plate 38 may be clamped together against the blank 8 by any suitable form of press, for example, by a cross bar 40 engaging an upward extension on the plate 38 and clamped down by threaded rods 42 and nuts 44. Surrounding the support 36 is a plate 46 suitably supported at 47 and having therein a hole of the shape of the plate 38 or of the innersole and enough larger to admit the thickness of the outsole stock between it and the edge of the plate 38. The outsole blank 8 and the plate 46 are initially positioned relatively, as shown in Fig. 11. Then, by relative movement of the plate 46 and the sole clamping means the margin of the outsole blank is made to assume an upstanding position as shown in Fig. 12. The molding of the outsole may be stopped at this point, the assembled innersole and upper parts placed within the upturned margin of the sole and the sole molded in over the flange of the upper parts to the margin of the innersole, as will be later described. I prefer, however, to carry the molding of the outsole farther as indicated in Fig. 13 before assembling the other parts with it. For further molding the outsole there are provided over the plate 36 inwardly movable edge turners 50, 52, as best shown in Fig. 10. The turners 50 are shown as two in number arranged one at each side of the sole, and the turners 52 are shown as twelve in number, six of these being arranged about each end of the sole. It is essential only, however, that the turners be sufficient in number to enable all portions of the sole margin extending above the plate 46 to be smoothly turned in over the plate. The turners are slotted at 54, are held from vertical movement by headed studs 55, and are moved inwardly of the sole by any suitable means such, for example, as screws 56 threaded through lugs 58 on the support 47 and engaging the outer ends of the turners so that by actuation of the screws the turners may be moved inwardly to turn over the upstanding margin of the sole as indicated in Fig. 13. The outsole is now removed from the molding apparatus and the plate 38 taken out from beneath the inturned margin of the outsole. In doing this, the inturned margin of the sole will be partly restored to its former upstanding position but will nevertheless have a tendency to bend inwardly as indicated in dotted lines at 59 in Fig. 15.

A member 60 (Fig. 14) is provided having the peripheral contour of the inside of the shoe and having an edge face 62 of sufficient height to support the upper parts 2, 4 inside the shoe and adjacent to the flange during subsequent operations. The member 60, which may be made of wood, is in two parts hinged together at 64 to permit its removal from the shoe in the manner of a hinged last. The molded upper parts 2, 4 and an innersole 6 are assembled on the last member 60, as indicated in Fig. 14, and the flanges of the parts 2 and 4 secured to the innersole by a few staples 66 driven through the flange of the upper and the margin of the innersole. This may conveniently be done as indicated in Fig. 16 by means of an upper stapling machine such, for example, as that disclosed in United States Letters Patent No. 1,103,935 granted July 21, 1914 on application of M. F. Brogan. The upper and innersole, assembled on the last member 60, are placed within the outsole blank 8 molded as described and the last member 60 and assembled shoe parts, 2, 4, 6 and 8, replaced in the sole molding apparatus (Figs. 10 and 15). The margin of the outsole which extends above the flange of the upper parts is molded in over the flange, as shown in Fig. 15, by inward movement of the turners 50, 52. The support 47 and turners 50, 52 are then moved relatively perpendicularly to the sole to cause the inturned portion of the sole to be pressed against the flange. The work engaging faces of the turners may be formed with teeth or ribs 70 (Fig. 18) so as to form indentations in the inturned margin of the sole, the indentations serving to produce an ornamental edge extension and to remove or obliterate any cracks or creases due to the molding operation and to contract the edge of the inturned margin to cause it to correspond to the lessened peripheral extension of the shoe at the line where the edge is now located as compared with the peripheral extension of the sole edge in its original flat condition. For some purposes the shoe may now be regarded as complete, the inturned margin of the outsole serving permanently to unite the sole with the other assembled shoe parts. I prefer, however, to avoid any tendency of the molded margin to return to its original condition by sewing through the edge extension of the shoe, as indicated in Fig. 17, using for this purpose an outsole sewing machine of the usual construction or a straight needle lockstitch machine such as the Campbell sewing machine as indicated, the seam 72 being formed and located as clearly shown in Fig. 3. In Fig. 3 the edge is shown partly in section adjacent to the notch 32 in the innersole. Since the flanges of the quarter portion and toe portion of the upper overlap for a short distance at the ends of the ball line the thickness of material over which the outsole is to be molded would be greater at this point than at the other parts of the shoe if the margin of the innersole were continuous. The notch 32, however, enables the flange 3 of the quarter portion 2, as shown in Fig. 3, to be depressed so as to lie in the plane of the innersole. Since the innersole is of the same thickness as the upper the total thickness of the flange at this point is maintained the same as the thickness of the flange including the innersole at other parts of the shoe. After the shoe is sewed, or before if desired, the last member 60 may be removed, this being readily done by turning up the rear portion of the member on its hinge and then moving it lengthwise of the shoe.

Figures 1B, 2:
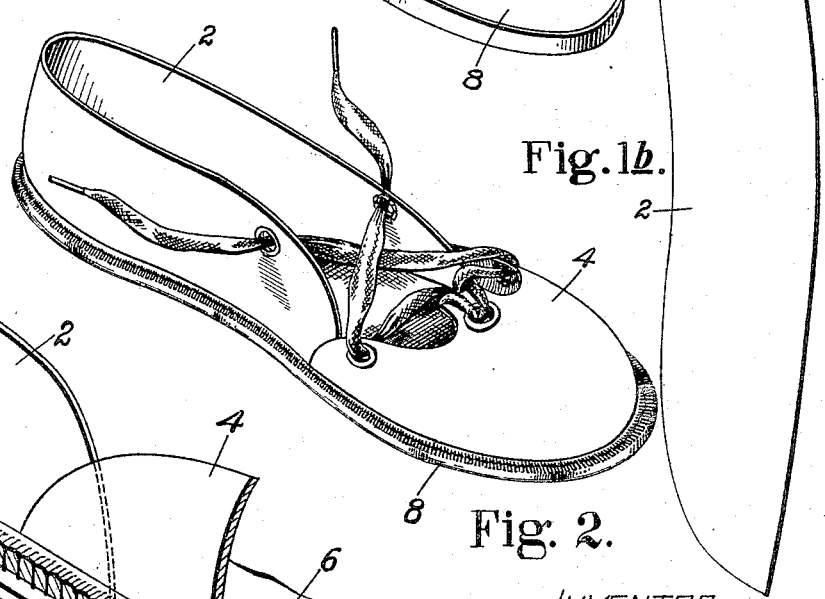
Fig. 2 is a perspective view of the completed shoe.

The shoe may be provided with a lacing as indicated in Fig. 2 or with other means for retaining it upon the foot and may be varnished or finished in other ways to enhance its appearance and durability.

Before subjecting the material, such as leatherboard, to molding operations such as those described it is highly important to have the material in the proper temper. I have found after extended experiments that the material works well if tempered in the way that leather is usually tempered and then allowed to become nearly dry before molding. The molding may then be done without danger of the material cracking and if the molding means is heated the shape is permanently retained.

A method of tempering blanks for molding which I have found satisfactory, particularly as applied to the outsole, is illustrated in Fig. 9. One or more outsole blanks 8 are clamped between plates 80, 82 by any suitable clamping means such as the bars 84, 86 and threaded rods 88, 90, which are pivoted to the bar 86 and engage notches in the bar 84. Nuts 92, 94 are provided on the rods 88, 90 to draw the bars 84, 86 toward each other to clamp the plates 80, 82 upon the soles between them. The plates are of a size and shape so that the portions of the blanks, for example, the marginal portions of outsole blanks, are exposed while the remaining surfaces of the blanks are protected by the plates 80, 82. The clamp with the blanks in it is dipped in a vessel 96 containing a tempering fluid, for instance water, which, having access to the exposed portions of the blanks which are to be molded, softens those portions while the remainder of the blank remains in its original dry condition. The blanks are removed from the clamps after the tempering fluid has acted sufficiently on the margins and are molded in the manner already described.

When an entire blank is subjected to the tempering operation it will expand and contract in a manner which it is difficult to predetermine or control, moreover the amount of expansion due to tempering is different in a direction transversely of the grain than it is lengthwise of the grain. By protecting the portion of the blank which does not require molding from the action of the tempering medium this uncertainty as to the condition of the blank and its size is obviated and the tempered margin of a sole blank cut to fit a shoe or given size can be molded in so as to cover the flange and lie at its edge close to the side of the shoe.

Having thus described my invention, what I claim as new and desire to secure by Letters Patent of the United States is:

1. As an article of manufacture, a shoe having an upper part formed with an outturned flange, and a sole forming the tread face of the shoe and having its margin extending across the edge face of the flange and across the top face of the flange.

2. As an article of manufacture, a shoe having an upper part formed with an outturned flange, a sole forming the tread face of the shoe and having its margin extending around the edge of the flange and over the top face of the flange, and a seam securing the inturned part of the sole, the outturned flange of the upper and the tread portion of the sole together.

3. As an article of manufacture, a shoe having molded quarter and toe parts provided with outturned sole attaching flanges, an innersole coextensive with the flanges, and an outsole the margin of which extends across the edge faces of the innersole and flange and over the top face of the flange.

4. As an article of manufacture, a shoe having molded quarter and toe parts provided with outturned sole attaching flanges, the flanges of the quarter and toe parts overlapping at the ends of the ball line and having an innersole coextensive with the flanges and provided with notches to receive the overlapping portion of a flange and having an outsole surrounding the sole attaching flange.

5. As an article of manufacture, a shoe having an upper part formed with an outturned flange, a sole forming the tread face of the shoe and having its margin extending across the edge face of the flange and over the top face of the flange, and fastenings securing the margin of the sole, the outturned flange of the upper and the tread portion of the sole together.

6. As an article of manufacture, a shoe having molded quarter and toe parts provided with outturned sole attaching flanges, an innersole coextensive with and secured to the flanges, an outsole the margin of which extends across the edge faces of the innersole and flange and over the top face of the flange, and stitches holding the flanges, innersole and outsole together.

7. As an article of manufacture, a shoe having molded quarter and toe parts provided with outturned sole attaching flanges, the flanges of the quarter and toe parts overlapping at the ends of the ball line and having an innersole coextensive with the flanges and provided with notches in its margin to receive the overlapping portion of a flange so as to provide a sole attaching flange of uniform thickness and an outsole molded over and down upon the flange.

8. That improvement in methods of making shoes, which consists in forming the shoe upper parts with outturned flanges, assembling the parts, preparing a sole blank having the shape of the periphery of the flanges of the assembled shoe parts and of greater size, and molding the margin of the sole over and down upon the flanges of the upper parts.

9. That improvement in methods of making shoes, which consists in forming shoe upper parts with outturned flanges, assembling the parts, preparing a sole blank having the shape of the periphery of the flanges of the assembled shoe parts and of greater size, molding the margin of the sole over and down upon the flanges of the upper parts, and stitch indenting the upper face of the molded margin.

10. That improvement in methods of making shoes, which consists in forming shoe upper parts with outturned flanges, assembling the parts, preparing a sole blank having the shape of the periphery of the flanges of the assembled shoe parts and of greater size, molding the margin of the sole over and down upon the flanges of the upper parts, and simultaneously forming upon the margin ridges extending transversely of the margin.

11. That improvement in methods of making shoes, which consists in forming shoe upper parts with outturned flanges, preparing an innersole coextensive with the flanges, preparing an outsole blank having the shape of the innersole and of greater size, assembling the upper parts and innersole upon the outsole, and molding the margin of the outsole over and down upon the flanges of the upper parts.

12. That improvement in methods of making shoes which consists in forming a toe blank and a quarter blank with outturned flanges, preparing an innersole blank of the shape of the shoe bottom including the flange, the flange being cut away at the ends of the ball line, assembling said parts in overlapping relation at the cut-away portion of the innersole, preparing an outsole blank larger than the inner sole, and molding the margin of the outsole over and upon the flanges of the toe and quarter blanks.

13. That improvement in methods of making shoes which consists in forming a toe blank and a quarter blank with outturned flanges, preparing an innersole blank of the shape of the shoe bottom including the flanges, assembling said parts, securing the flanges to the innersole, preparing an outsole blank having a size in excess of that of the innersole, molding the margin of the outsole into upstanding relation to the body portion, placing the assembled upper and innersole within the upturned margin of the outsole, and molding the margin of the outsole around the edge of the innersole and over and upon the flanges of the toe and quarter blanks.

14. That improvement in methods of making shoes which consists in forming shoe upper parts with outturned flanges, preparing an innersole of substantially the size and shape of the shoe bottom, preparing an outsole blank having the shape of the innersole and of greater size, preliminarily molding the margin of the outsole over a sole-shaped pattern, assembling the upper parts and innersole together, securing the flanges to the innersole to hold the parts in assembled relation, substituting for the said pattern the assembled shoe parts, and molding the margin of the sole down upon the flanges of the upper parts.

15. That improvement in methods of making shoes which consists in forming a toe blank and a quarter blank with outturned flanges, preparing an innersole blank of the shape of the shoe bottom including the flange, assembling said parts, preparing a sole blank having the size and shape of the innersole plus a margin equal to the width of the flange and the combined thicknesses of the innersole and flange, molding the margin of the sole into upstanding relation to the body portion, placing the assembled parts within the upturned margin of the sole, and molding the margin of the sole over and upon the flange of the innersole, toe and vamp blanks.

16. That improvement in methods of shaping shoe part blanks of sheet material into the form which they are to assume in the finished shoe which consists in shaping the body portion of the blank over a form by effecting relative movement heightwise of the form between the form and a tool having a rounded advance corner of the peripheral contour of the form, and then folding the margin of the blank outwardly over a tool having a square corner.

17. That improvement in methods of shaping shoe upper blanks of sheet material into the form which they are to assume in the finished shoe which consists in shaping the body portion of a toe blank to a toe form by advancing a tool having a rounded edge heightwise of the form, substituting for said tool a tool having a square edge, and then folding the margin of the blank outwardly over the square edge.

18. That improvement in methods of shaping shoe part blanks of sheet material into the shape which they are to assume in the finished shoe which consists in shaping the body portion of a blank into the shape of a shoe part, clamping the blank in the shape it has been made to assume with a clamp having a square corner along the line where the margin of the blank is to be turned, and turning the blank outwardly over the square edge of the clamp.

19. That improvement in methods of shaping shoe part blanks of sheet material into the shape which they are to assume in the finished shoe which consists in shaping the body portion of a blank into the shape of a shoe part, clamping the blank in the shape it has been made to assume with a clamp having a square corner along the line where the margin of the blank is to be turned, turning the blank outwardly over the square edge of the clamp, and trimming the outturned flange to a predetermined width by applying as a guide for the trimming knife a templet the inner periphery of which corresponds to the desired outer periphery of the blank.

In testimony whereof I have signed my name to this specification.

THOMAS H. SEELY.